US012070108B2

(12) United States Patent
Matsunaga et al.

(10) Patent No.: US 12,070,108 B2
(45) Date of Patent: Aug. 27, 2024

(54) BAND DEVICE, WRISTWATCH, AND END PIECE

(71) Applicant: SONY CORPORATION, Tokyo (JP)

(72) Inventors: Kentaro Matsunaga, Tokyo (JP); Tatsuhito Aono, Tokyo (JP)

(73) Assignee: SONY CORPORATION, Tokyo (JP)

( * ) Notice: Subject to any disclaimer, the term of this patent is extended or adjusted under 35 U.S.C. 154(b) by 337 days.

(21) Appl. No.: 16/763,225

(22) PCT Filed: Aug. 9, 2018

(86) PCT No.: PCT/JP2018/029983
§ 371 (c)(1),
(2) Date: May 11, 2020

(87) PCT Pub. No.: WO2019/097779
PCT Pub. Date: May 23, 2019

(65) Prior Publication Data

US 2020/0329833 A1 Oct. 22, 2020

(30) Foreign Application Priority Data

Nov. 20, 2017 (JP) ................................ 2017-222747

(51) Int. Cl.
*A44C 5/14* (2006.01)
*A44C 5/22* (2006.01)
(Continued)

(52) U.S. Cl.
CPC .................. *A44C 5/14* (2013.01); *A44C 5/22* (2013.01); *G04B 37/16* (2013.01); *G04G 17/04* (2013.01)

(58) Field of Classification Search
CPC .... A44C 5/14; A44C 5/22; A44C 5/24; A44C 5/0015; G04B 37/16; G04B 37/1486; G04B 37/1493; G04G 17/04; G04G 21/02
See application file for complete search history.

(56) References Cited

U.S. PATENT DOCUMENTS 6,619,835 B2 * 9/2003 Kita ..................... A44C 5/0015 368/282
9,152,129 B2 * 10/2015 Modaragamage ....... G04G 9/00
(Continued)

FOREIGN PATENT DOCUMENTS

CN 1446501 A 10/2003
CN 104635919 A 5/2015
(Continued)

OTHER PUBLICATIONS

Office Action for CN Patent Application No. 201880073500.4, issued on Dec. 28, 2021, 11 pages of English Translation and 08 pages of Office Action.
(Continued)

*Primary Examiner* — Robert Sandy
*Assistant Examiner* — Louis A Mercado
(74) *Attorney, Agent, or Firm* — CHIP LAW GROUP

(57) ABSTRACT

There is provided a band device that includes an annular band portion that forms a hollow portion, and the annular band portion includes a sensor module, a buckle portion, and an engaging portion detachably engaged with a plurality of end pieces to which a watch head is attached. The buckle portion includes a central blade, a first movable blad, and a second movable blade.

8 Claims, 17 Drawing Sheets

(51) Int. Cl.
*G04B 37/16* (2006.01)
*G04G 17/04* (2006.01)

(56) References Cited

U.S. PATENT DOCUMENTS

| | | | | |
|---|---|---|---|---|
| 9,292,008 | B1 | 3/2016 | Ahamed et al. | |
| 9,380,949 | B2 * | 7/2016 | Schuessler | G04G 21/025 |
| 9,720,376 | B2 * | 8/2017 | Tsushima | G04G 17/06 |
| 9,723,899 | B2 * | 8/2017 | Modaragamage | A44C 5/147 |
| 9,768,628 | B2 * | 9/2017 | Fish | H02J 7/342 |
| 9,897,974 | B2 * | 2/2018 | Nicolas | A44C 5/14 |
| 10,042,326 | B2 * | 8/2018 | Nicolas | A44C 5/0007 |
| 10,136,857 | B2 * | 11/2018 | Nuovo | A61B 5/318 |
| 10,143,272 | B2 * | 12/2018 | Fostinis | A44C 5/14 |
| 10,278,592 | B2 * | 5/2019 | Fish | A61B 5/0002 |
| 10,455,907 | B2 * | 10/2019 | Fernandes Demetrio | A44C 5/12 |
| 2003/0182770 | A1 | 10/2003 | Koshoji | |
| 2015/0085623 | A1 | 3/2015 | Modaragamage | |
| 2015/0378312 | A1 | 12/2015 | Modaragamage | |
| 2016/0070393 | A1 * | 3/2016 | Sharma | A61B 5/7475 345/174 |
| 2016/0143403 | A1 * | 5/2016 | Pluemer | A44C 5/00 224/267 |
| 2016/0206056 | A1 | 7/2016 | Pluemer et al. | |
| 2016/0231712 | A1 | 8/2016 | Ahamed et al. | |
| 2016/0324277 | A1 | 11/2016 | Modaragamage | |
| 2016/0334759 | A1 | 11/2016 | Modaragamage | |
| 2017/0006977 | A1 | 1/2017 | Modaragamage | |
| 2017/0017785 | A1 | 1/2017 | Rice et al. | |
| 2017/0127773 | A1 | 5/2017 | Modaragamage | |
| 2017/0339137 | A1 | 11/2017 | Vanoni et al. | |
| 2019/0129363 | A1 | 5/2019 | Modaragamage | |
| 2020/0125035 | A1 | 4/2020 | Modaragamage | |

FOREIGN PATENT DOCUMENTS

| | | | | | |
|---|---|---|---|---|---|
| CN | 105935185 | A | | 9/2016 | |
| CN | 107072361 | A | | 8/2017 | |
| CN | 107402627 | A | | 11/2017 | |
| CN | 107430384 | A | | 12/2017 | |
| EP | 3118762 | A1 | | 1/2017 | |
| EP | 3118764 | A1 | | 1/2017 | |
| EP | 3160287 | A1 | | 5/2017 | |
| EP | 3254160 | A1 | | 12/2017 | |
| EP | 3516980 | A1 | | 7/2019 | |
| ES | 2742893 | T3 | | 2/2020 | |
| GB | 2522510 | A | * | 7/2015 | A44C 5/0007 |
| JP | 024233 | C | | 7/1913 | |
| JP | 56-083217 | U | | 7/1981 | |
| JP | 57-146518 | U | | 9/1982 | |
| JP | 3029022 | U | | 9/1996 | |
| JP | 10-127318 | A | | 5/1998 | |
| JP | 3051839 | U | | 9/1998 | |
| JP | 2002-143107 | A | | 5/2002 | |
| JP | 2003-275005 | A | | 9/2003 | |
| JP | 2017-027594 | A | | 2/2017 | |
| JP | 2017-073429 | A | | 4/2017 | |
| JP | 2017-520314 | A | | 7/2017 | |
| JP | 2020-114457 | A | | 7/2020 | |
| PT | 3160287 | T | | 7/2019 | |
| TW | 201629649 | A | | 8/2016 | |
| WO | 2015/200688 | A1 | | 12/2015 | |
| WO | WO-2016038058 | A2 | * | 3/2016 | A44C 5/12 |
| WO | 2016/081913 | A1 | | 5/2016 | |
| WO | 2016/125034 | A1 | | 8/2016 | |

OTHER PUBLICATIONS

Office Action for JP Patent Application No. 2019-553695 issued on Jul. 5, 2022, 03 pages of English Translation and 03 pages of Office Action.

International Search Report and Written Opinion of PCT Application No. PCT/JP2018/029983, issued on Oct. 2, 2018, 09 pages of ISRWO.

Extended European Search Report of EP Application No. 18878459.9, issued on Jan. 14, 2021, 07 pages.

* cited by examiner

20

20

BAND DEVICE, WRISTWATCH, AND END PIECE

CROSS REFERENCE TO RELATED APPLICATIONS

This application is a U.S. National Phase of International Patent Application No. PCT/JP2018/029983 filed on Aug. 9, 2018, which claims priority benefit of Japanese Patent Application No. JP 2017-222747 filed in the Japa Patent Office on Nov. 20, 2017. Each of the above-referenced applications is hereby incorporated herein by reference in its entirety.

TECHNICAL FIELD

The present disclosure relates to a band device, a wristwatch, and an end piece.

BACKGROUND ART

A wristwatch includes a watch head, a band wound around an arm, and end pieces connecting the watch head and the band. There is also known a structure in which attachment and detachment between a watch head and each end piece are performed without using a tool, and according to this structure, a watch head of a wristwatch can be easily replaced with another watch head.

In recent years, wearable terminals having an information processing function have been increasingly widely used. Patent Document 1 discloses an electronic device which includes a circuit board in a band, and in which attachment and detachment between each end piece and a watch head can be performed. The watch head can be easily replaced with another watch head with respect to the band and each end piece in the electronic device, as well.

CITATION LIST

Patent Document

Patent Document 1: Japanese Patent Application Laid-Open No. 2017-73429

SUMMARY OF THE INVENTION

Problems to be Solved by the Invention

However, in the electronic device described in Patent Document 1, a watch head having a lug width corresponding to the size of the end piece can be attached to the end piece, but a watch head having a lug width not corresponding to the size of the end piece cannot be attached to the end piece. That is, other watch heads that can be attached to the band and the end pieces are limited in the electronic device described in Patent Document 1.

Therefore, the present disclosure proposes a band device, a wristwatch, and an end piece that are novel and improved, and can realize attachment of more various types of watch heads.

Solutions to Problems

According to the present disclosure, a band device is provided that includes an annular band portion that forms a hollow portion, in which the band portion includes: a sensor module; and an engaging portion detachably engaged with end pieces to which a watch head is attached.

Furthermore, according to the present disclosure, a wristwatch is provided that includes: a band portion including a sensor module; end pieces attachable to and detachable from the band portion; and a watch head attached to the end pieces.

Furthermore, according to the present disclosure, an end piece is provided that includes: a piece housing portion including a back surface located on a wearer's skin side and a front surface on a side opposite to the back surface; and a connecting portion protruding from the back surface of the piece housing portion and detachably engaged with the band portion.

Effects of the Invention

The band device, the wristwatch and the end piece according to the present disclosure described above realize attachment of more various types of watch heads.

Note that the effects described above are not necessarily limited, and any of the effects shown in the present description, or other effects that can be known from the present description may be achieved together with or in place of the effects described above.

MODE FOR CARRYING OUT THE INVENTION

Figure 1:
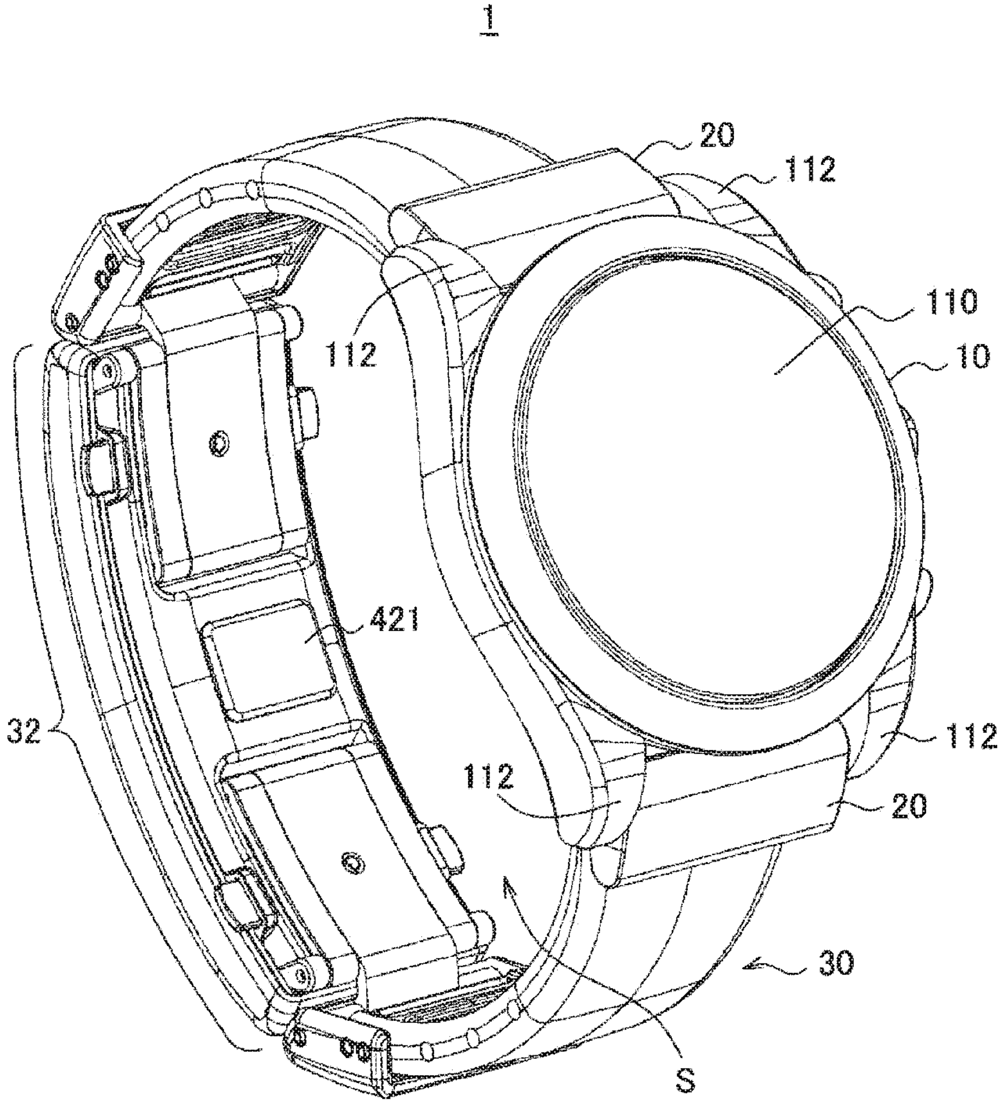
FIG. 1 is a perspective view illustrating a configuration of a wristwatch according to an embodiment of the present disclosure.

Hereinafter, a preferred embodiment of the present disclosure will be described in detail with reference to the accompanying drawings. Note that in the present description and drawings, the same reference numeral is added to components having substantially the same functional configuration, and redundant descriptions thereof will be omitted.

Furthermore, in the present description and drawings, multiple components having substantially the same functional configuration are sometimes distinguished from each other by adding different alphabets after the same reference numeral. However, in a case where there is no need to particularly distinguish each of the multiple components having substantially the same functional configuration, only the same reference numeral is added to each of the multiple components.

Furthermore, the present disclosure will be described according to the following item order.

1. Overview of Wristwatch
2. Configuration of Buckle Portion
3. Configuration of Engaging Portion
4. Configuration of End Piece and Attachment Thereof to Band Portion
5. Working Effects
6. Modifications
7. Supplement <1. Overview of Wristwatch>

FIG. 1 is a perspective view illustrating a configuration of a wristwatch 1 according to an embodiment of the present disclosure. As illustrated in FIG. 1, the wristwatch 1 according to the embodiment of the present disclosure includes a watch head 10, end pieces 20, and a band portion 30.

(Overview of Configuration of Wristwatch)

The watch head 10 includes a display surface 110 and lugs 112. The display surface 110 is configured to display a time. The display surface 110 includes a dial, an hour hand, and a minute hand, and a time may be displayed by the hour hand and the minute hand pointing any position on the dial.

Alternatively, the display surface 110 may be configured with a liquid crystal display, and a screen indicating a time may be displayed on the liquid crystal display. The screen may be a screen that simulates an analog watch or a screen that provides a digital representation of a time. Furthermore, the watch head 10 may have a function of a smartwatch. The lugs 112 protrude along an extending direction of the band portion 30, and two opposing lugs 112 are provided on both sides (hereinafter sometimes referred to as upper and lower sides) in the extending direction of the band portion 30. The two opposing lugs 112 are separated from each other in a width direction.

The end piece 20 is attached to an interval between the two opposing lugs 112 of the watch head 10 on each of the upper and lower sides of the watch head 10. The end pieces 20 also engage with the band portion 30. The watch head 10 and the band portion 30 are connected by the end pieces 20.

The band portion 30 is an example of a band device that is annular and forms a hollow portion S. Although the band portion 30 is not illustrated on a back surface side of the watch head 10 in FIG. 1, the band portion 30 continuously exists between the upper and lower sides of the watch head 10. The band portion 30 includes a buckle portion 32. A circuit board is mounted on the buckle portion 32. A sensor function and a wireless communication function are implemented in the circuit board as described later, and a pulse sensor 421 that performs a part of the sensor function is exposed on an inner peripheral side of the band portion 30 as illustrated in FIG. 1.

(Connection Between Watch Head and Band Portion)

Subsequently, the above-described connection between the watch head 10 and the band portion 30 will be described with reference to FIGS. 2 and 3.

Figure 2:
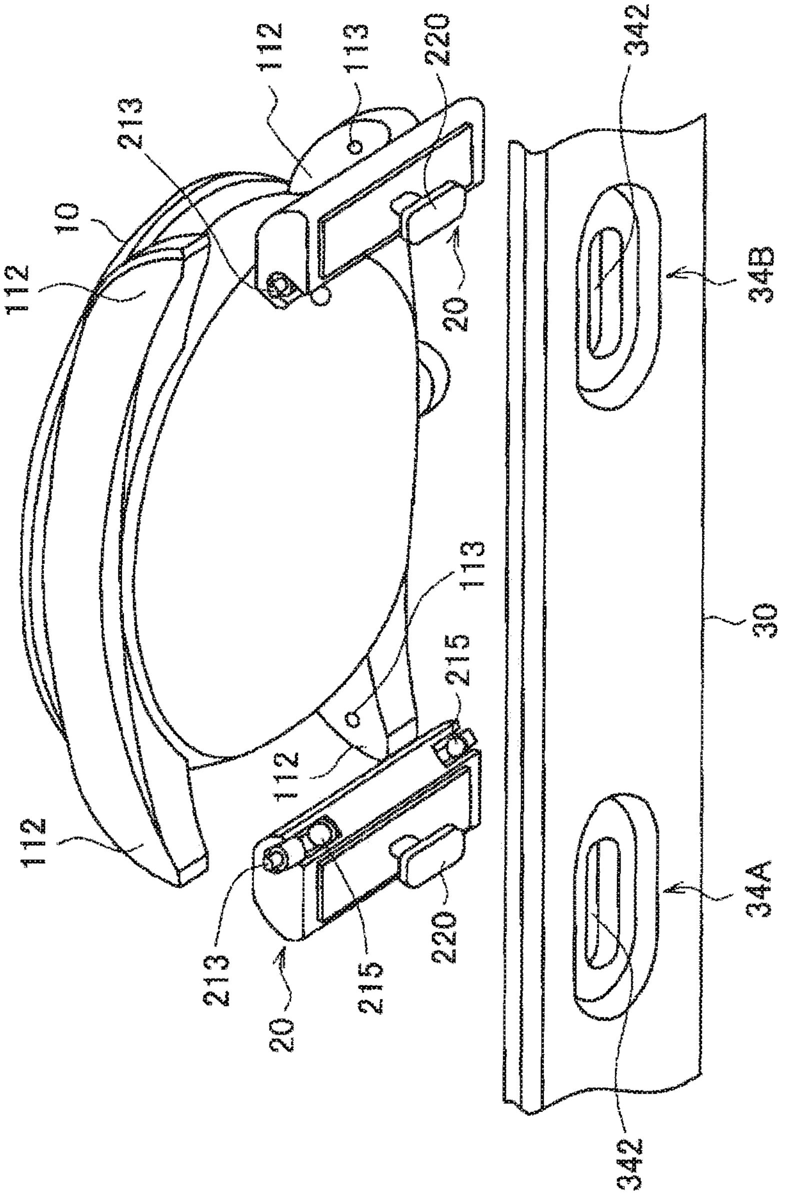
FIG. 2 is a separated perspective view of the wristwatch according to the embodiment of the present disclosure.
Figure 3:
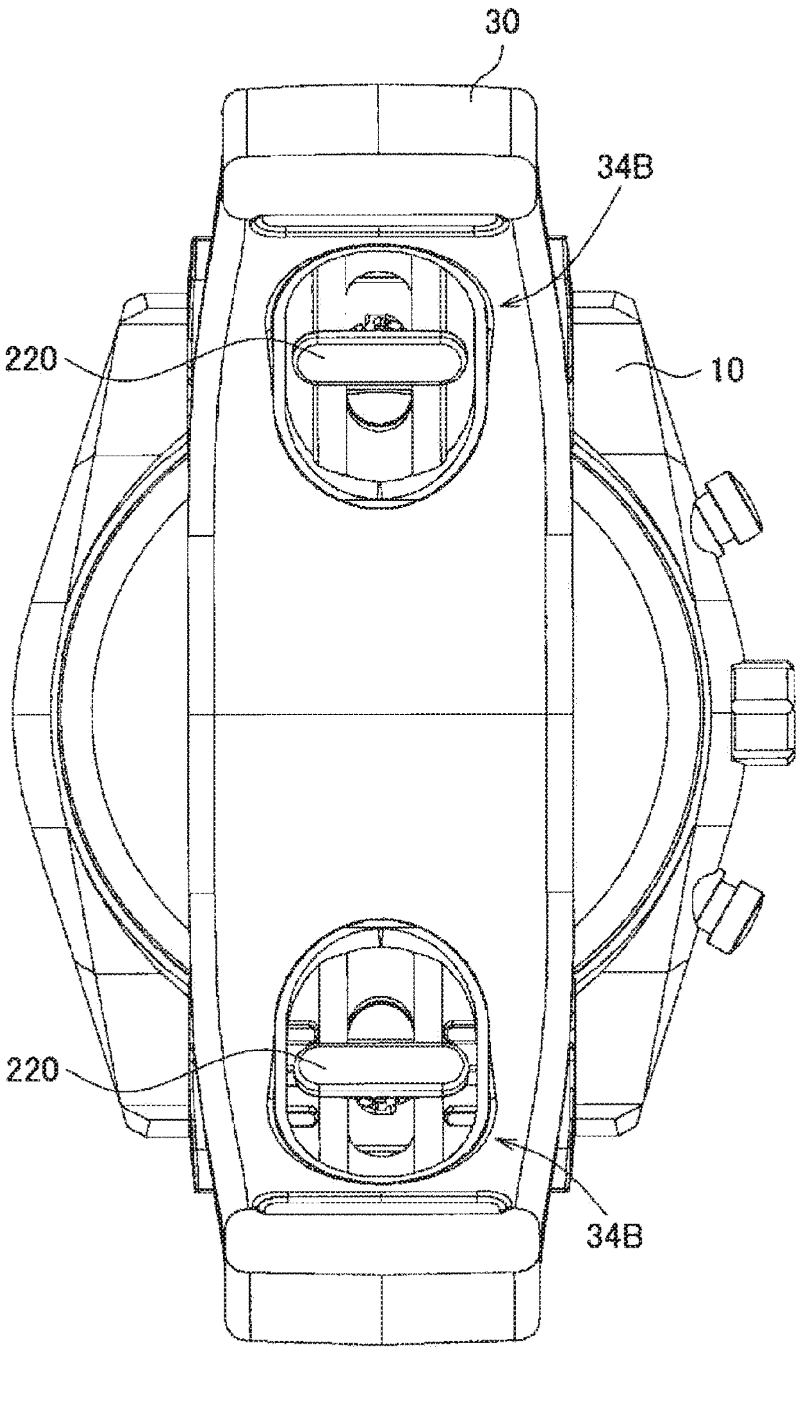
FIG. 3 is an explanatory view illustrating the configuration of the wristwatch viewed from a back surface side of a watch head.

FIG. 2 is a separated perspective view of the wristwatch 1 according to the embodiment of the present disclosure. FIG. 3 is an explanatory view illustrating the configuration of the wristwatch 1 viewed from the back surface side of the watch head 10. First, attachment of the watch head 10 to the end pieces 20 will be described. As illustrated in FIG. 2, each lug 112 of the watch head 10 includes a pin hole 113 at an inside in the width direction. Furthermore, the end pieces 20 each include pins 213 protruding to both sides in the width direction. The watch head 10 is attached to the end pieces 20 by the pins 213 inserted into the pin holes 113 of the lugs 112. Here, the pins 213 are urged to an outside in the width direction, and the end pieces 20 each include operating levers 215 for retracting the pins 213 against an urging force. Consequently, a wearer can easily perform detachment and attachment between each end piece 20 and the watch head 10 by operating the operating levers 215, without using a tool.

Next, attachment of the end pieces 20 to the band portion 30 will be described. As illustrated in FIG. 2, a connecting portion 220 protruding to a band portion 30 side is formed on a band portion 30 side (sometimes referred to as a back surface side) of each end piece 20. Engaging portions 34 (34A and 34B) of the band portion 30 each include an opening 342. The wearer inserts the connecting portions 220 of the end pieces 20 into the openings 342 and rotates the connecting portions 220, and thereby the end pieces 20 and the band portion 30 are engaged with each other and the end pieces 20 are attached to the band portion 30 as illustrated in FIG. 3. The wearer also can remove the end pieces 20 from the band portion 30 by rotating the connecting portions 220 of the end pieces 20 in a state illustrated in FIG. 3 to pull out the connecting portions 220 from the openings 342. That is, the wearer can easily perform detachment and attachment between each end piece 20 and the band portion 30 without using a tool.

(Significance of Wristwatch According to Embodiment of Present Disclosure)

As described above, the wristwatch 1 according to the embodiment of the present disclosure includes the band portion 30 that is annular, and in which the sensor function, the wireless communication function, and the like are implemented. Then, the end pieces 20 can be detached from and attached to the band portion 30. Consequently, the wearer can use the band portion 30 alone as a wearable terminal, or use the wristwatch 1 in which the end pieces 20 and the watch head 10 are attached to the band portion 30.

Furthermore, various types of end pieces 20 having different sizes can be detached from and attached to the band portion 30. That is, the end pieces 20 having sizes corresponding to various types of watch heads 10 having different lug widths can be detached from and attached to the band portion 30. Thus, it is possible to easily attach the watch head 10 having a different lug width to the band portion 30 via the different end pieces 20.

The overview of the wristwatch 1 according to the embodiment of the present disclosure has been described above. Hereinafter, the configuration of the wristwatch 1 will be described more specifically.

<2. Configuration of Buckle Portion>

Figure 4:
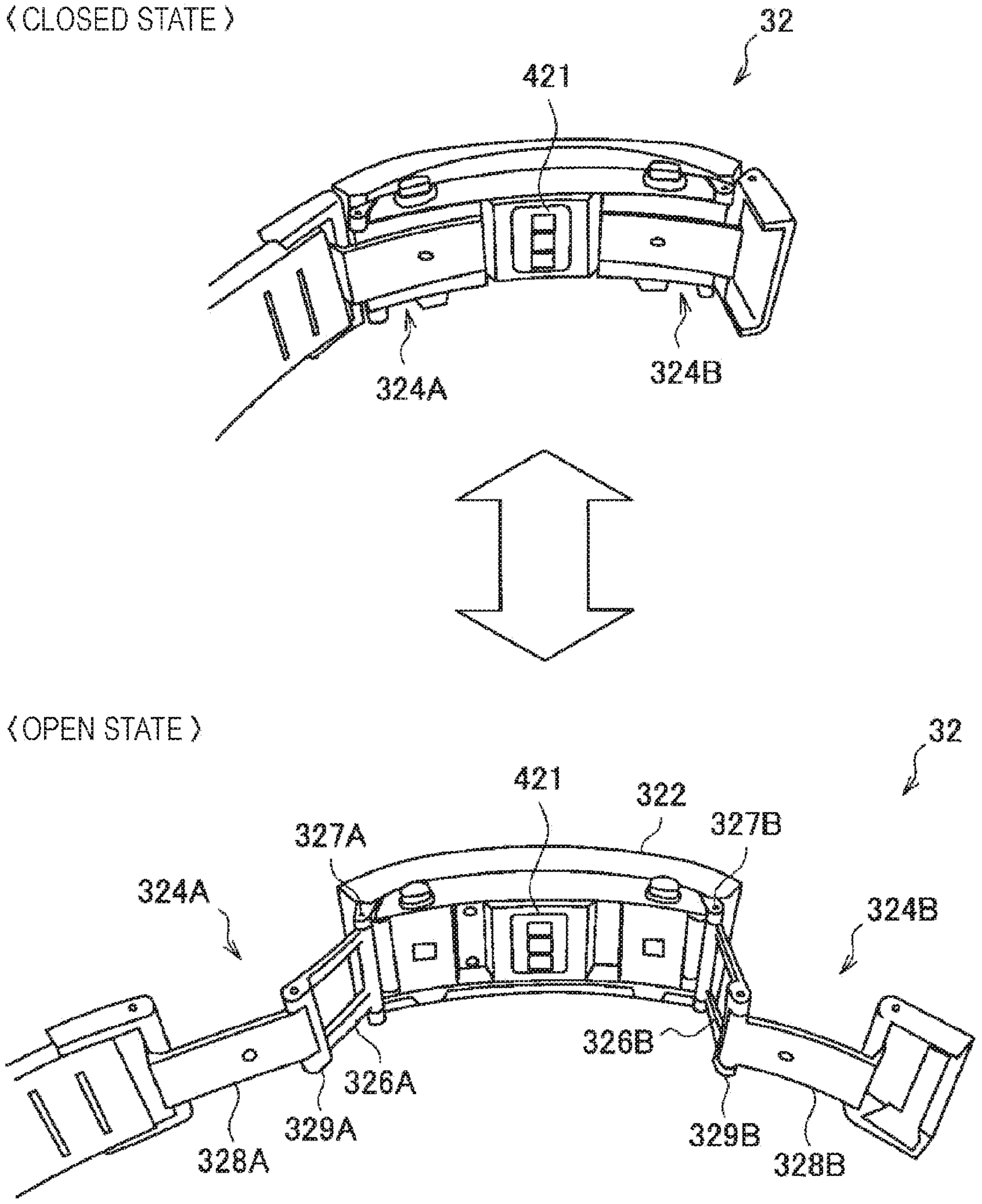
FIG. 4 is an explanatory view illustrating a closed state and an open state of a buckle portion.

First, a configuration of the buckle portion 32 which is a part of the band portion 30 will be described with reference to FIG. 4. FIG. 4 is an explanatory view illustrating a closed state and an open state of the buckle portion 32. As illustrated in FIG. 4, the buckle portion 32 includes a central blade 322 (including a circuit board 40), a first movable blade 324A, and a second movable blade 324B.

The first movable blade 324A includes links 326A and 328A, and the second movable blade 324B includes links 326B and 328B. The link 326A of the first movable blade 324A is connected to one end of the central blade 322 via a joint 327A, and the link 326B of the second movable blade 324B is connected to the other end of the central blade 322 via a joint 327B. The links 326A and 328A of the first movable blade 324A are connected via a joint 329A, and the links 326B and 328B of the second movable blade 324B are connected via a joint 329B.

In the closed state of the buckle portion 32, the links 326A and 328A of the first movable blade 324A are folded on one end side of the central blade 322, and the links 326B and 328B of the second movable blade 324B are folded on the other end side of the central blade 322. The first movable blade 324A and the second movable blade 324B are provided such that there is an interval therebetween in this closed state. Consequently, as illustrated in an upper view of FIG. 4, the pulse sensor 421 can be exposed at an interval portion between the first movable blade 324A and the second movable blade 324B.

The buckle portion 32 transitions from the closed state to the open state by the first movable blade 324A and the second movable blade 324B being unfolded. Specifically, the first movable blade 324A and the second movable blade 324B are unfolded by the link 326A of the first movable blade 324A rotating around the joint 327A and the link 328A thereof rotating around the joint 329A, as well as the link 326B of the second movable blade 324B rotating around the joint 327B and the link 328B thereof rotating around the joint 329B. In the open state of the buckle portion 32, the band portion 30 has a longer outer peripheral length, so that the wearer can put his/her arm through the band portion 30, and can remove the band portion 30 from his/her arm.

(Circuit Board)

In the embodiment of the present disclosure, a circuit board in which a sensor function, a wireless communication function, and the like are implemented is included in the central blade 322 of the buckle portion 32 described above. Hereinafter, a configuration of the circuit board included in the central blade 322 of the buckle portion 32 will be described.

Figure 5:
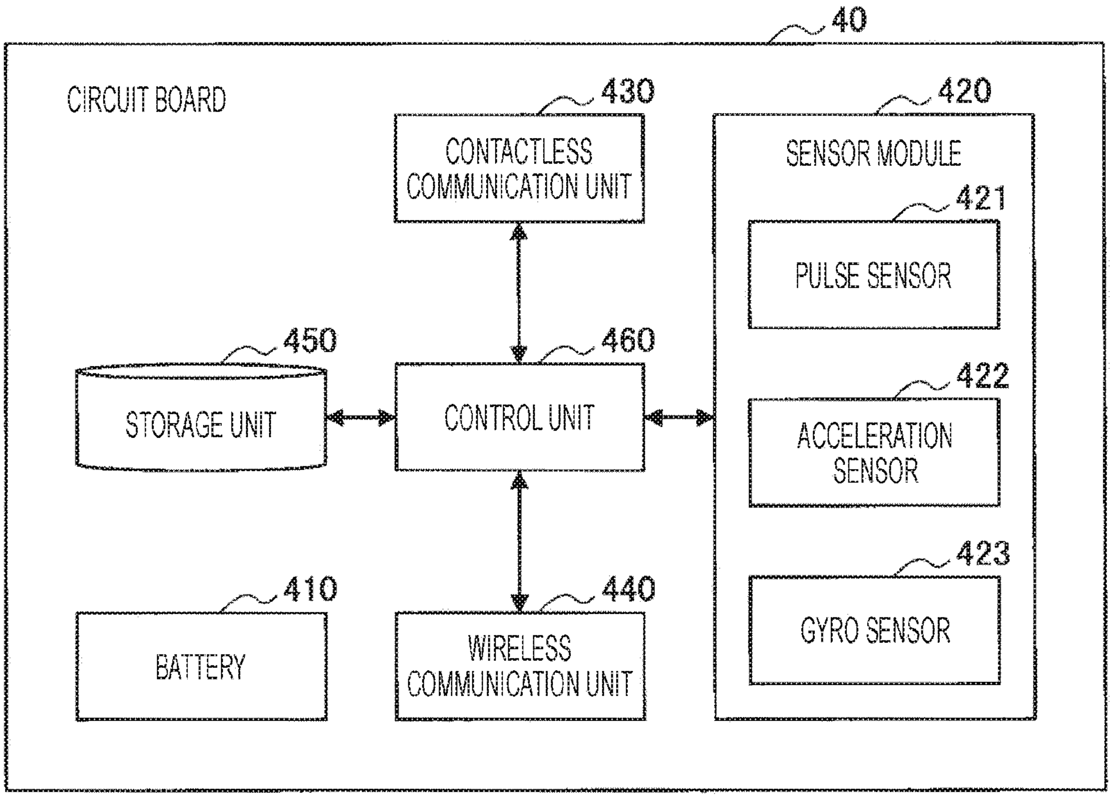
FIG. 5 is an explanatory diagram illustrating a configuration of a circuit board.

FIG. 5 is an explanatory diagram illustrating the configuration of the circuit board 40. As illustrated in FIG. 5, the circuit board 40 includes a battery 410, a sensor module 420, a contactless communication unit 430, a wireless communication unit 440, a storage unit 450, and a control unit 460.

The battery 410 is a secondary battery that supplies power to each configuration of the circuit board 40.

The sensor module 420 is a module for detecting one or two or more physical quantities. In the example illustrated in FIG. 5, the pulse sensor 421, an acceleration sensor 422, and a gyro sensor 423 are illustrated as sensors included in the sensor module 420. The sensors included in the sensor module 420 are not limited to those in the example illustrated in FIG. 5, and the sensor module 420 may include other sensors or may not include some or all of the sensors illustrated in FIG. 5.

The contactless communication unit 430 is an interface for performing contactless communication with another communication device. Examples of use cases of contactless communication between the contactless communication unit 430 and another communication device include payment for goods at a retail store, payment for a fare at a station ticket gate, authentication, and the like.

The wireless communication unit 440 is an interface for performing wireless communication, which has a communicable range wider than contactless communication, with another communication device. The wireless communication unit 440 may perform wireless communication by a wireless LAN or may perform wireless communication by Bluetooth (registered trademark). The wireless communication unit 440 is used, for example, when the wearer transmits information detected by the sensor module 420 to a smartphone used by the wearer.

The storage unit 450 stores information used for operations of the circuit board 40. For example, the storage unit 450 stores a program for causing the control unit 460 to operate and information detected by the sensor module 420.

The control unit 460 controls the overall operations of the circuit board 40. For example, the control unit 460 controls start and stop of the sensor module 420, contactless communication performed by the contactless communication unit 430, wireless communication performed by the wireless communication unit 440, and the like.

<3. Configuration of Engaging Portion>

Figure 6:
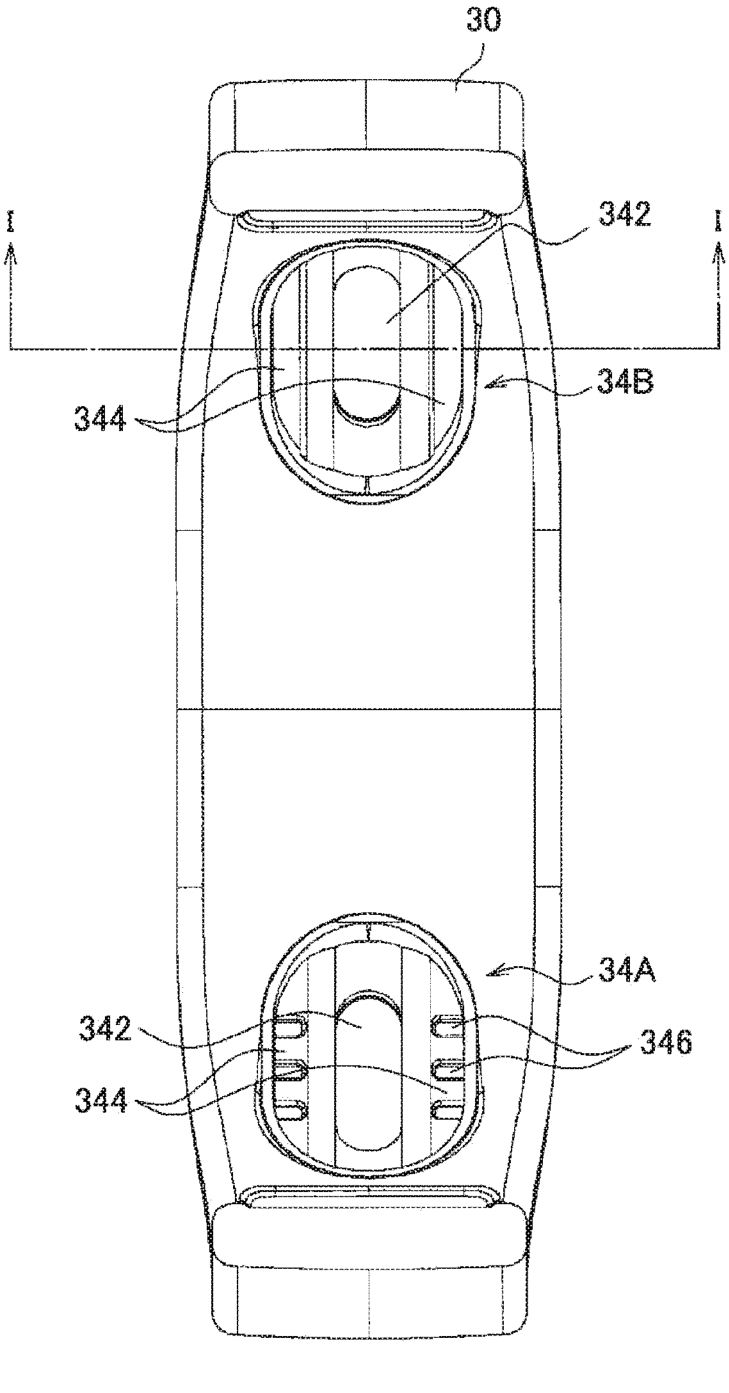
FIG. 6 is an explanatory view illustrating a configuration of each of engaging portions viewed from an inside of a band portion.
Figure 7:
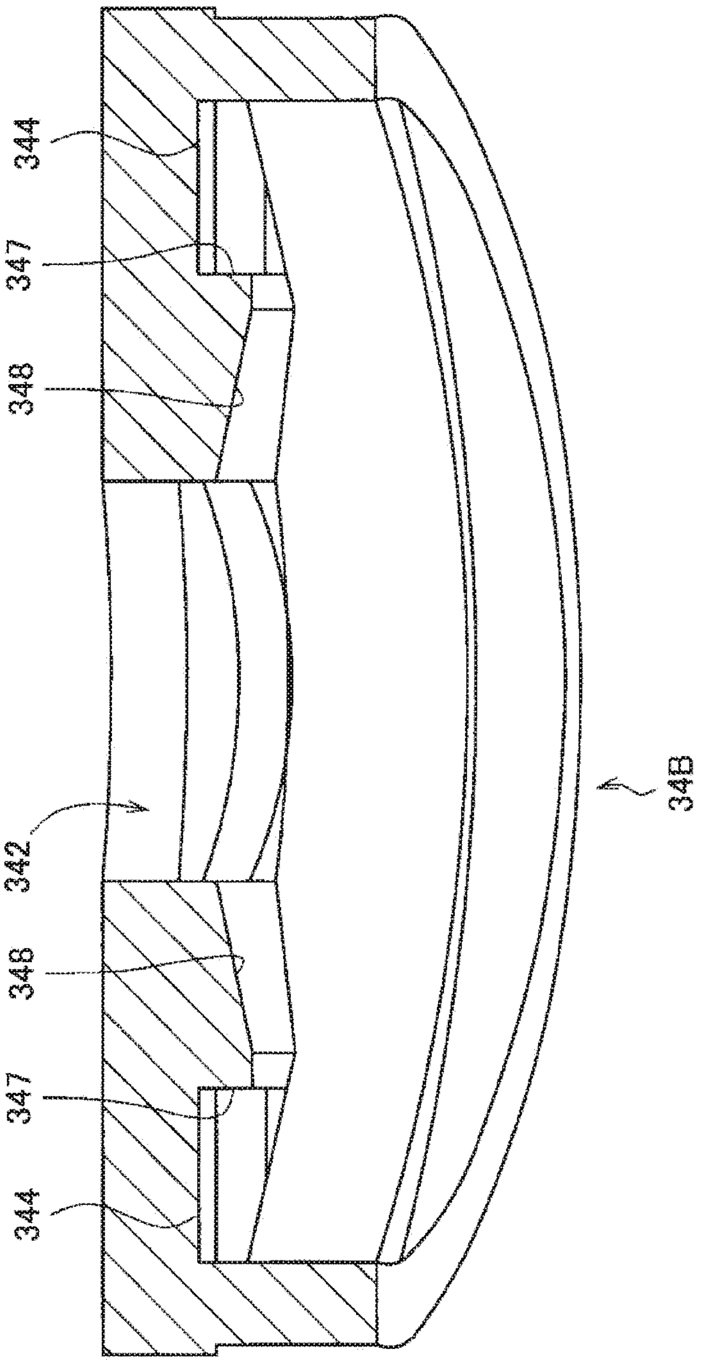
FIG. 7 is an explanatory view illustrating a cross section taken along I-I of the engaging portion illustrated in FIG. 6.

Next, a configuration of the engaging portion 34 provided in the band portion 30 will be described. FIG. 6 is an explanatory view illustrating the configuration of each of the engaging portions 34A and 34B viewed from an inside of the band portion 30. FIG. 7 is an explanatory view illustrating a cross section taken along I-I of the engaging portion 34B illustrated in FIG. 6.

The engaging portion 34B includes the opening 342, abutment surfaces 344, step portions 347, and inclined surfaces 348, as illustrated in FIGS. 6 and 7. A longitudinal direction of the opening 342 corresponds to the extending direction of the band portion 30, and a transverse direction of the opening 342 corresponds to a width direction of the band portion 30. The abutment surfaces 344 are surfaces formed on both sides in a width direction of the opening 342 along the extending direction of the band portion 30. At an edge of each abutment surface 344 on an opening 342 side, the step portion 347 protruding from the abutment surface 344 to a wearer's skin side is formed. The inclined surface 348 is located between the step portion 347 and the opening 342, and gets closer to the wearer's skin side at a position farther from the opening 342.

The engaging portion 34A includes multiple recesses 346 as illustrated in FIG. 6, in addition to the above-described opening 342, abutment surfaces 344, step portions 347, and inclined surfaces 348. The multiple recesses 346 are formed on the abutment surface 344 separately from each other in the extending direction of the band portion 30. At the same positions as those of the recesses 346 formed on one abutment surface 344 in the extending direction of the band portion 30, the same positions being on the other abutment surface 344, the recesses 346 to be paired up with the recesses 346 on the one abutment surface 344 are formed. That is, multiple pairs of the recesses 346 are formed on the abutment surfaces 344 of the engaging portion 34A.

Protrusions 225, which will be described later, of the end piece 20 are fitted into any one pair of the recesses 346 among the multiple pairs of the recesses 346 described above, and thereby the end piece 20 and the watch head 10 are positioned with respect to the band portion 30. On the other hand, since the recesses 346 are not provided in the engaging portion 34B, the end piece 20 can be engaged at any position along the engaging portion 34B and the opening 342. Thus, it is possible to steplessly adjust an interval between the positions where the two end pieces 20 are engaged with the band portion 30 while positioning the one end piece 20 and the watch head 10 with respect to the band portion 30.

<4. Configuration of End Piece and Attachment Thereof to Band Portion>

Next, a configuration of the end piece 20 and attachment of the end piece 20 to the band portion 30 will be described.

(Configuration of End Piece)

Figure 8:
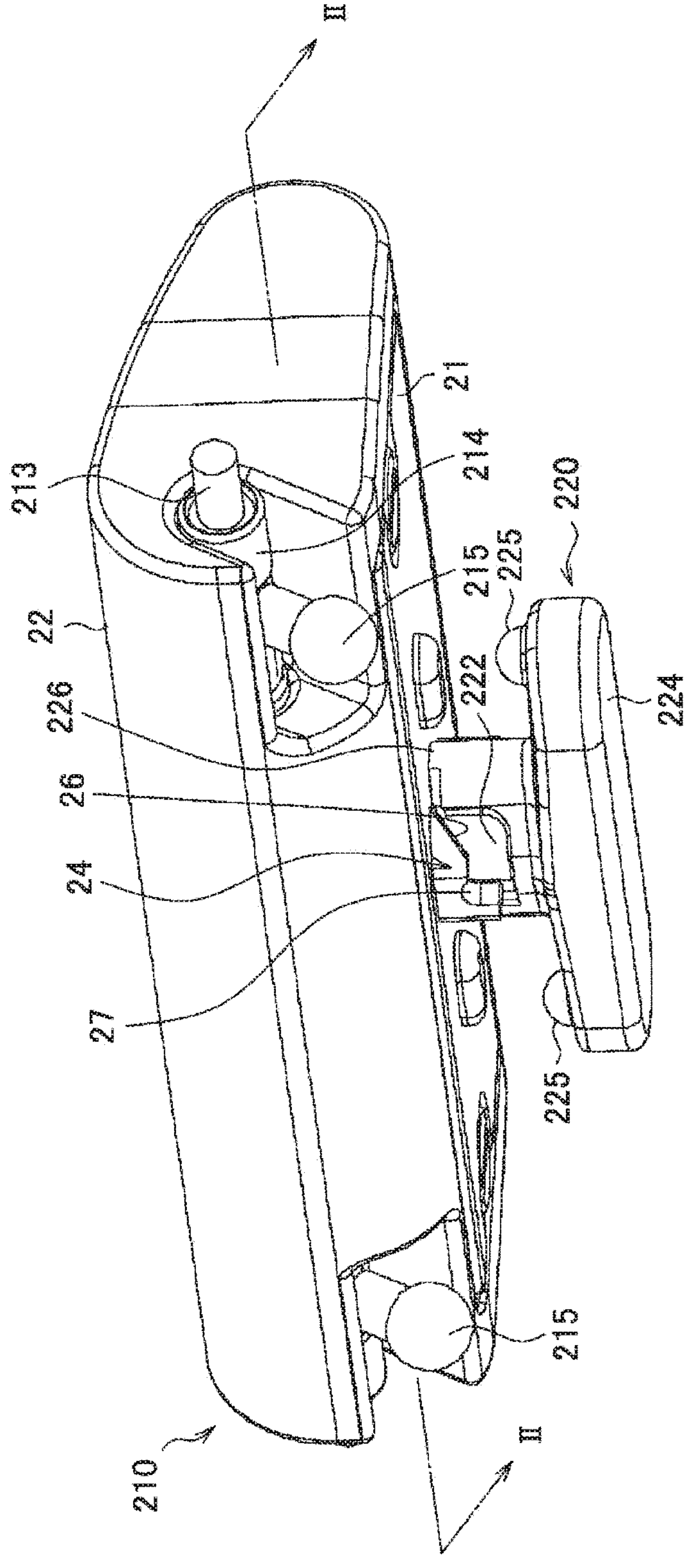
FIG. 8 is a perspective view of an end piece.

FIG. 8 is a perspective view of the end piece 20. As illustrated in FIG. 8, the end piece 20 includes a piece housing portion 210 and the connecting portion 220.

The piece housing portion 210 includes a back surface 21 facing the wearer's skin side, and a front surface 22 facing a side opposite to the back surface 21. The piece housing portion 210 includes the pins 213, cylinders 214, and the operating levers 215. The pins 213 are provided one at each end in a width direction of the piece housing portion 210, and protrude to an outside in the width direction. The pins 213 are each urged by an urging member (not illustrated) in a direction protruding to the outside in the width direction. The cylinders 214 cover the outer peripheries of the pins 213 and guide reciprocation of the pins 213. The operating levers 215 can reciprocate along the width direction of the piece housing portion 210, and the pins 213 move in conjunction with the movement of the operating levers 215. Specifically, if the wearer moves the operating levers 215 to an inside in the width direction, the pins 213 are pulled in against an urging force, and if the wearer releases his/her hand from the operating levers 215, the pins 213 return to the position where the pins 213 protrude to the outside in the width direction by the urging force.

The connecting portion 220 includes a shaft portion 222 and an overhang portion 224. The shaft portion 222 is formed along a thickness direction of the piece housing portion 210 from the back surface 21 of the piece housing portion 210. The overhang portion 224 overhangs from an end portion of the shaft portion 222 in a direction perpendicular to the thickness direction of the piece housing portion 210. The protrusions 225 protruding to a piece housing portion 210 side are formed at both end portions in a longitudinal direction of the overhang portion 224. Such a connecting portion 220 is urged to a front surface 22 side of the piece housing portion 210. Hereinafter, the urging of the connecting portion 220 will be described with reference to FIG. 9.

Figure 9:
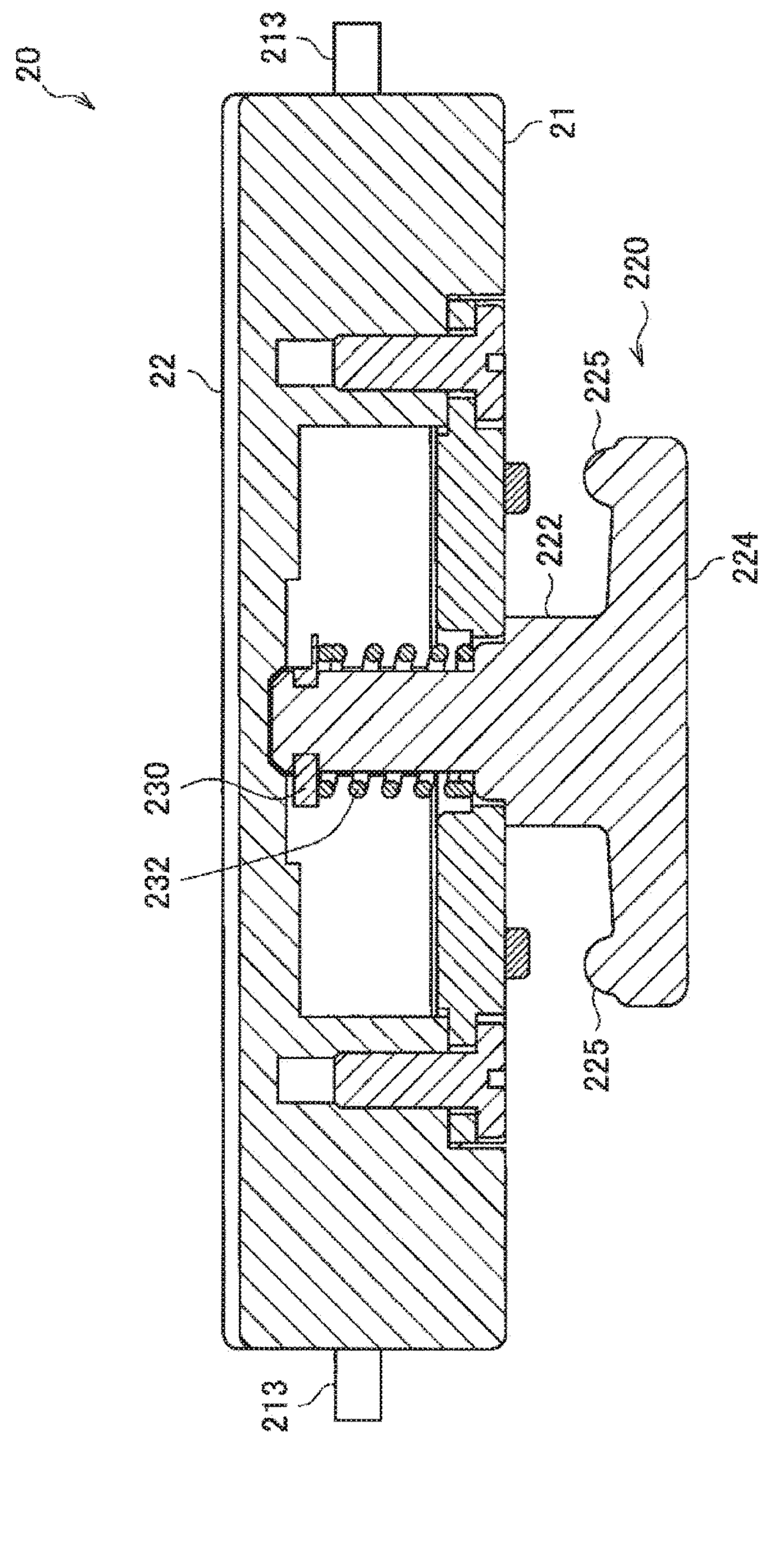
FIG. 9 is an explanatory view illustrating a cross section taken along line II-II of FIG. 8.

FIG. 9 is an explanatory view illustrating a cross section taken along line II-II of FIG. 8. As illustrated in FIG. 9, the piece housing portion 210 includes an E-ring 230 and a spring 232 therein. The E-ring 230 is provided to be rotatable relative to the shaft portion 222. The spring 232 is an example of an elastic portion that urges the connecting portion 220, and is provided between an inner wall of the piece housing portion 210 and the E-ring 230 so as to surround the outer periphery of the shaft portion 222. With such a configuration, the connecting portion 220 is rotatable with respect to the piece housing portion 210, and is urged to the front surface 22 side of the piece housing portion 210.

As illustrated in FIG. 8, the piece housing portion 210 includes a guide portion 24 formed along an edge of a hole into which the shaft portion 222 is inserted. The guide portion 24 includes an inclined surface 26 whose height from the back surface 21 of the piece housing portion 210 continuously changes along a circumferential direction of the hole, and a locking portion 27 that is a recess located adjacent to an end portion of the inclined surface 26 on a side of the overhang portion 224. Furthermore, the shaft portion 222 includes a sliding portion 226 that slides on the inclined surface 26 of the guide portion 24 when the connecting portion 220 rotates. Hereinafter, a rotation operation of the connecting portion 220 will be described with reference to FIGS. 10 and 11.

Figure 10:
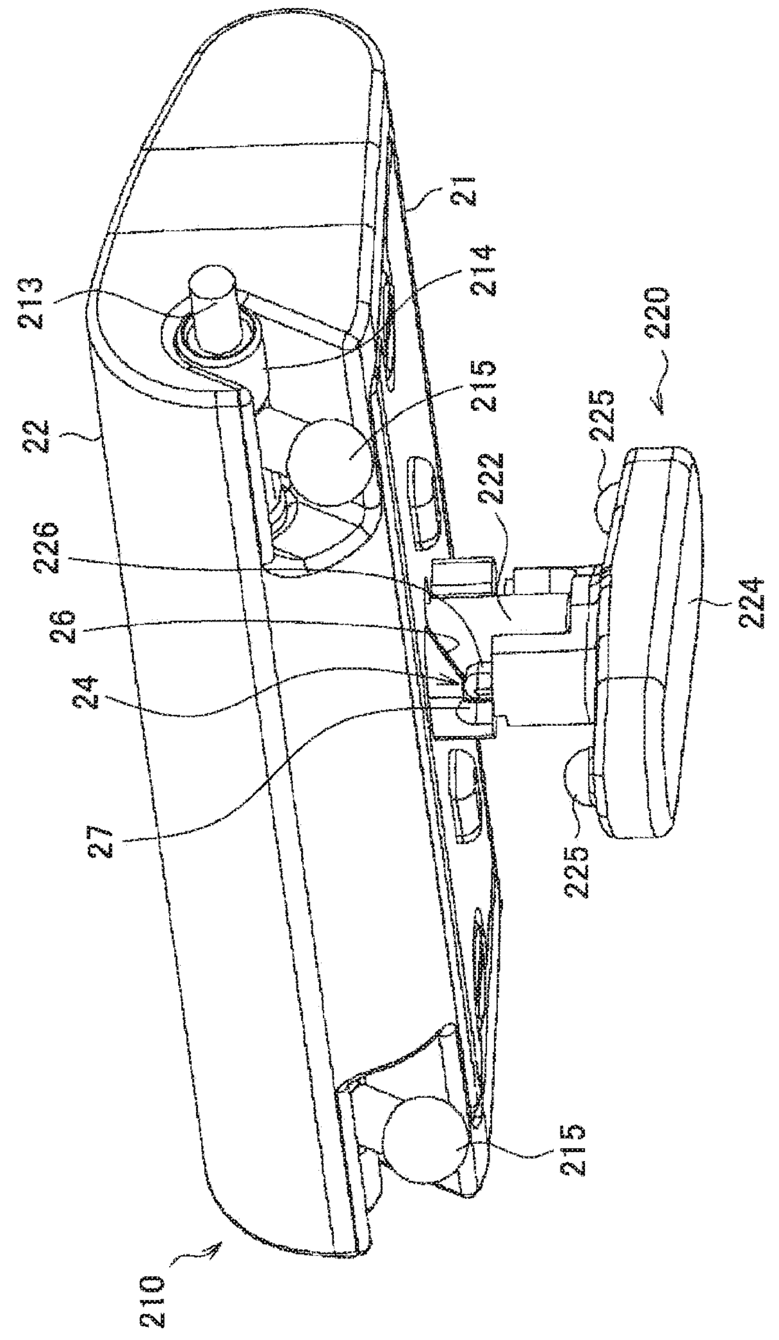
FIG. 10 is an explanatory view illustrating a rotating process of a connecting portion.

FIG. 10 is an explanatory view illustrating a rotation process of the connecting portion 220. As illustrated in FIG. 10, if a user holds the overhang portion 224 and rotates the connecting portion 220, the sliding portion 226 slides on the inclined surface 26 of the guide portion 24, and thereby the connecting portion 220 is pulled out against an urging force of the spring 232.

Figure 11:
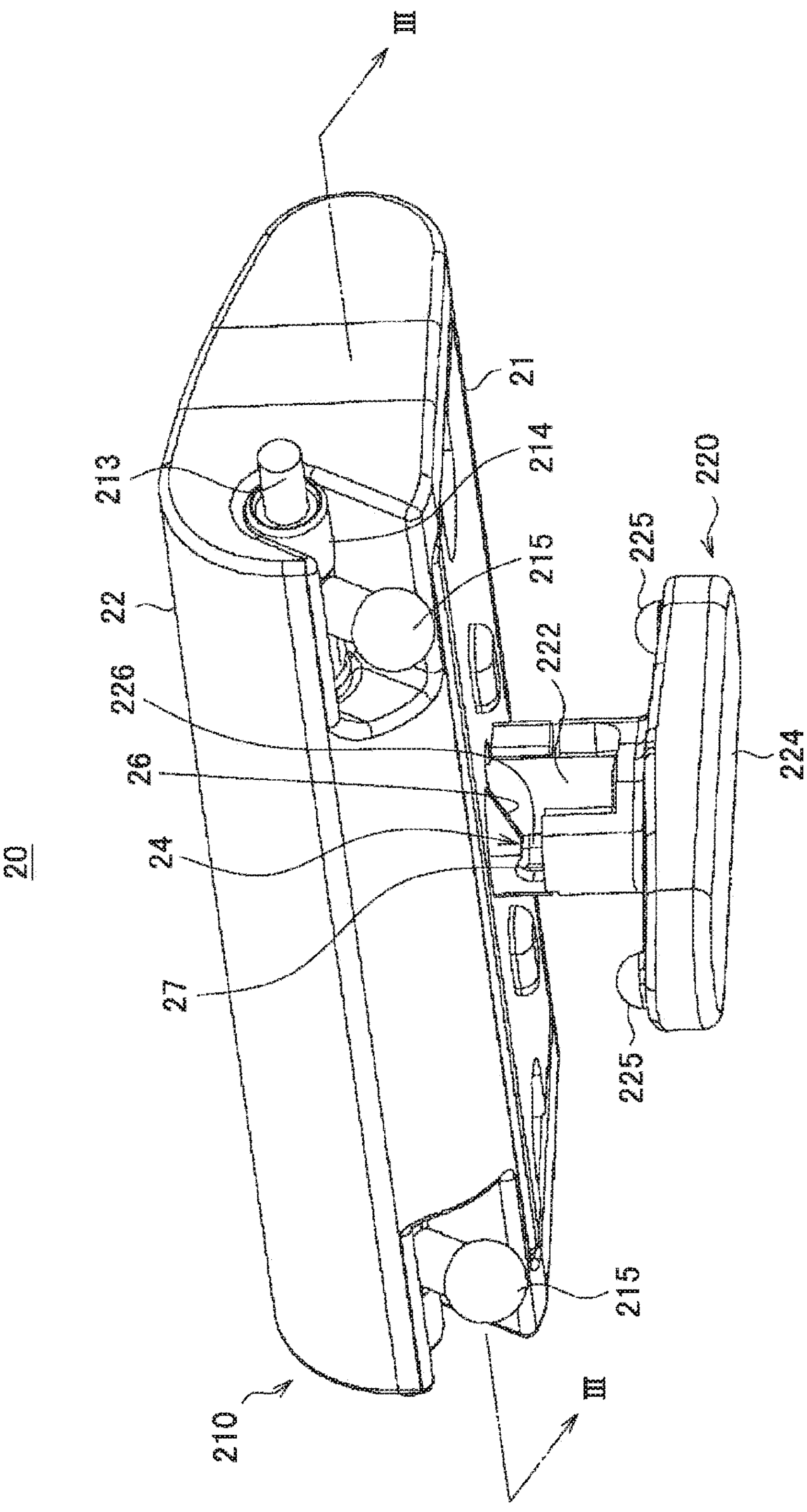
FIG. 11 is an explanatory view illustrating a state of the connecting portion after rotation.

FIG. 11 is an explanatory view illustrating a state of the connecting portion 220 after the rotation. As illustrated in FIG. 11, by the sliding portion 226 being fitted into the locking portion 27 of the guide portion 24, the connecting portion 220 is locked with respect to the piece housing portion 210.

Figure 12:
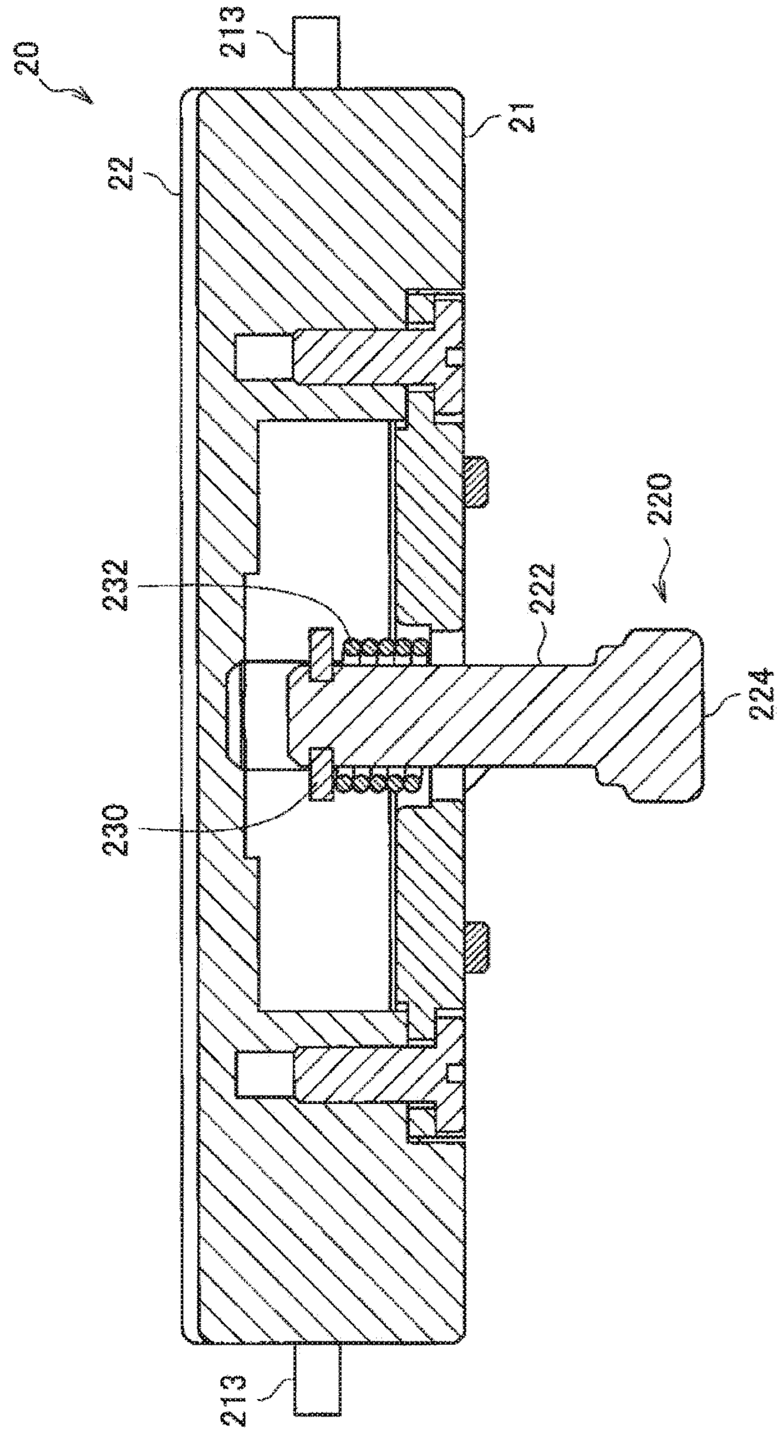
FIG. 12 is an explanatory view illustrating a cross section taken along line III-III illustrated in FIG. 11.

FIG. 12 is an explanatory view illustrating a cross section taken along line III-III illustrated in FIG. 11. As can be understood from a comparison between FIG. 9 and FIG. 11, the connecting portion 220 is pulled out from the piece housing portion 210 in a state where the sliding portion 226 illustrated in FIG. 11 is fitted in the locking portion 27 of the guide portion 24.

(Attachment of End Piece to Band Portion)

The configuration of the end piece 20 has been described above. Subsequently, attachment of the end piece 20 to the band portion 30 will be described.

Figure 13:
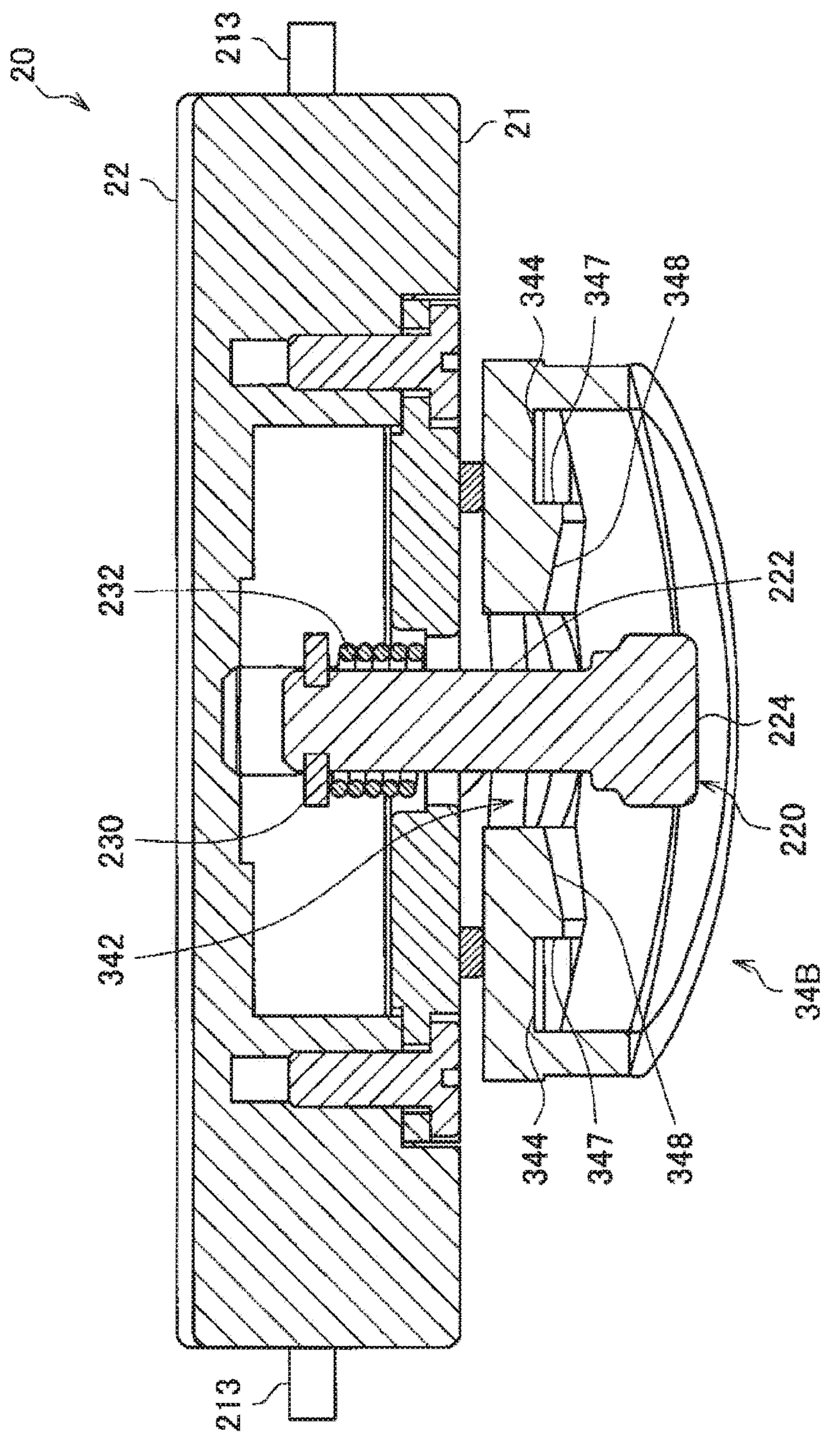
FIG. 13 is a cross-sectional view illustrating a state where the connecting portion is inserted in an opening of the band portion.

The wearer inserts the connecting portion 220 into the opening 342 of the band portion 30 in a state where the sliding portion 226 is fitted in the locking portion 27 of the guide portion 24 as illustrated in FIG. 11. FIG. 13 is a cross-sectional view illustrating a state where the connecting portion 220 is inserted in the opening 342 of the band portion 30.

Figure 14:
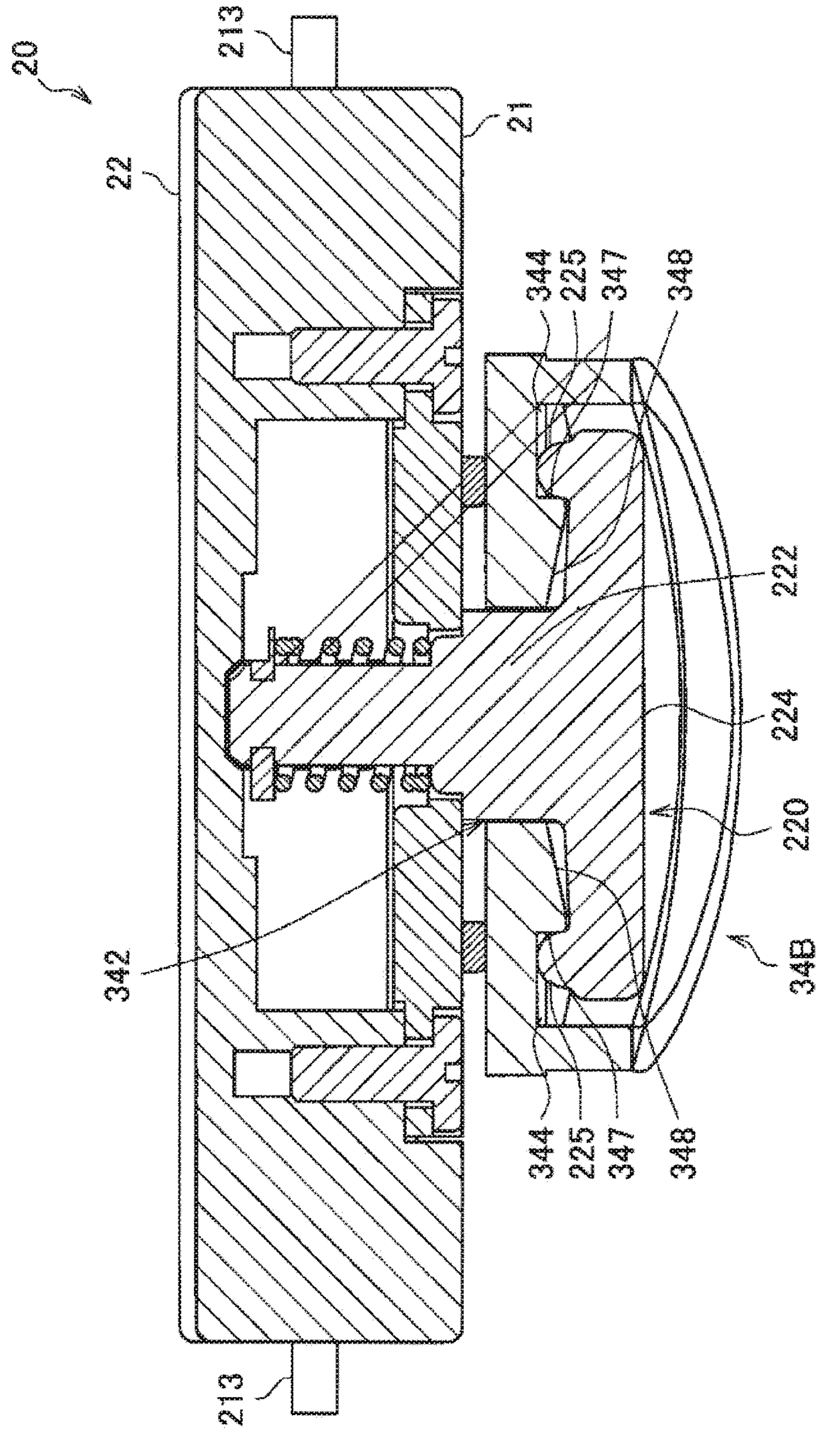
FIG. 14 is a cross-sectional view illustrating a state where a longitudinal direction of an overhang portion matches a width direction of the band portion.

Thereafter, the wearer releases the fitting of the sliding portion 226 in the locking portion 27 by pulling the connecting portion 220, and rotates the connecting portion 220 such that the longitudinal direction of the overhang portion 224 matches the width direction of the band portion 30. FIG. 14 is a cross-sectional view illustrating a state where the longitudinal direction of the overhang portion 224 matches the width direction of the band portion 30.

In the state illustrated in FIG. 14, the protrusions 225 of the overhang portion 224 are abutting the abutment surfaces 344 of the engaging portion 34. Moreover, since the overhang portion 224 is urged to the piece housing portion 210 side by the spring 232, the protrusions 225 press the abutment surfaces 344 with a force corresponding to the urging force. Moreover, the step portions 347 of the engaging portion 34 are adjacent to the protrusions 225. Due to such abutment between the protrusions 225 and the abutment surfaces 344, and the adjacency of the protrusions 225 and the step portions 347, the rotation of the connecting portion 220 including the overhang portion 224 is restricted, and a state where the end piece 20 is attached to the band portion 30 is maintained. In that state, the wearer can remove the end piece 20 from the band portion 30 by pulling the connecting portion 220 and rotating the connecting portion 220 such that the longitudinal direction of the overhang portion 224 matches the longitudinal direction of the opening 342.

<5. Working Effects>

The configuration of the wristwatch 1 according to the embodiment of the present disclosure has been described above. Hereinafter, working effects of the wristwatch 1 according to the embodiment of the present disclosure will be summarized.

Figure 15:
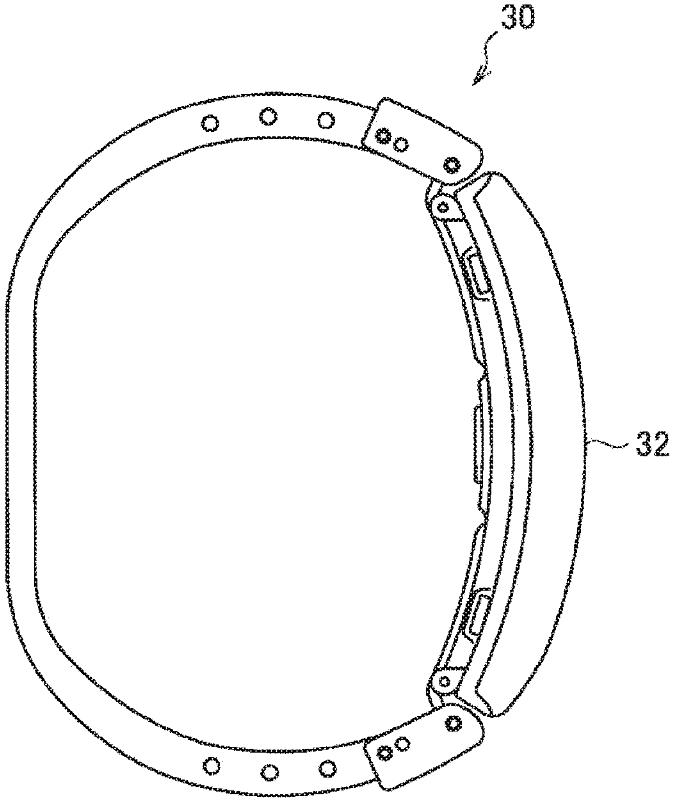
FIG. 15 is an explanatory view illustrating use of the band portion alone.

As described above, the band portion 30 is annular, and the sensor function, the wireless communication function, and the like are implemented in the band portion 30. Then, the end pieces 20 can be detached from and attached to the band portion 30. Consequently, the wearer can use the band portion 30 alone as a wearable terminal, or use the wrist-watch 1 in which the end pieces 20 and the watch head 10 are attached to the band portion 30. That is, the wearer can easily switch between use of the wristwatch 1 as illustrated in FIG. 1 and use of the band portion 30 alone as illustrated in FIG. 15. For example, the user can use the band portion 30 alone while bathing and sleeping, and use the wristwatch 1 in which the end pieces 20 and the watch head 10 are attached to the band portion 30 when going out.

Figure 16:
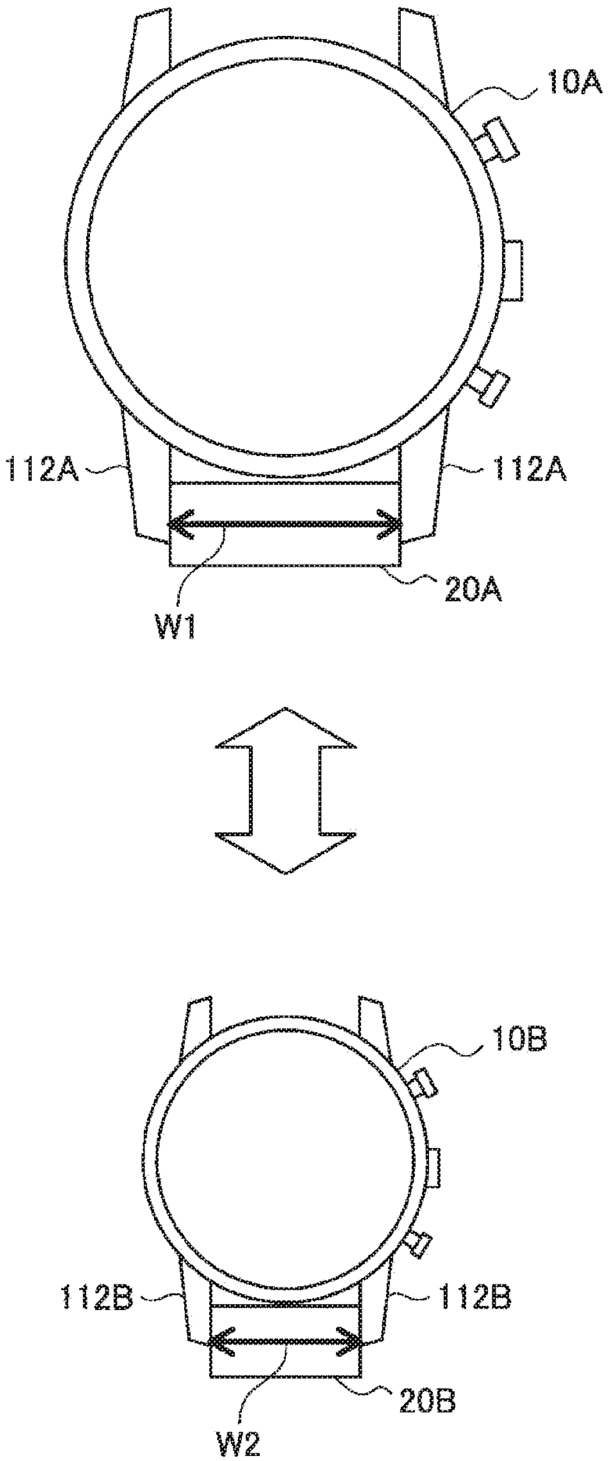
FIG. 16 is an explanatory view illustrating application to watch heads of various sizes.

Furthermore, various types of end pieces 20 having different sizes can be detached from and attached to the band portion 30. For example, as illustrated in FIG. 16, an end piece 20A corresponding to a lug width w1 and an end piece 20B corresponding to a lug width w2 can be attached to the band portion 30. As a result, any of a watch head 10A having the lug width w1 and a watch head 10B having the lug width w2 can be attached to the band portion 30. As described above, according to the embodiment of the present disclosure, various types of watch heads 10 having different lug widths can be attached to the band portion 30.

Figure 17:
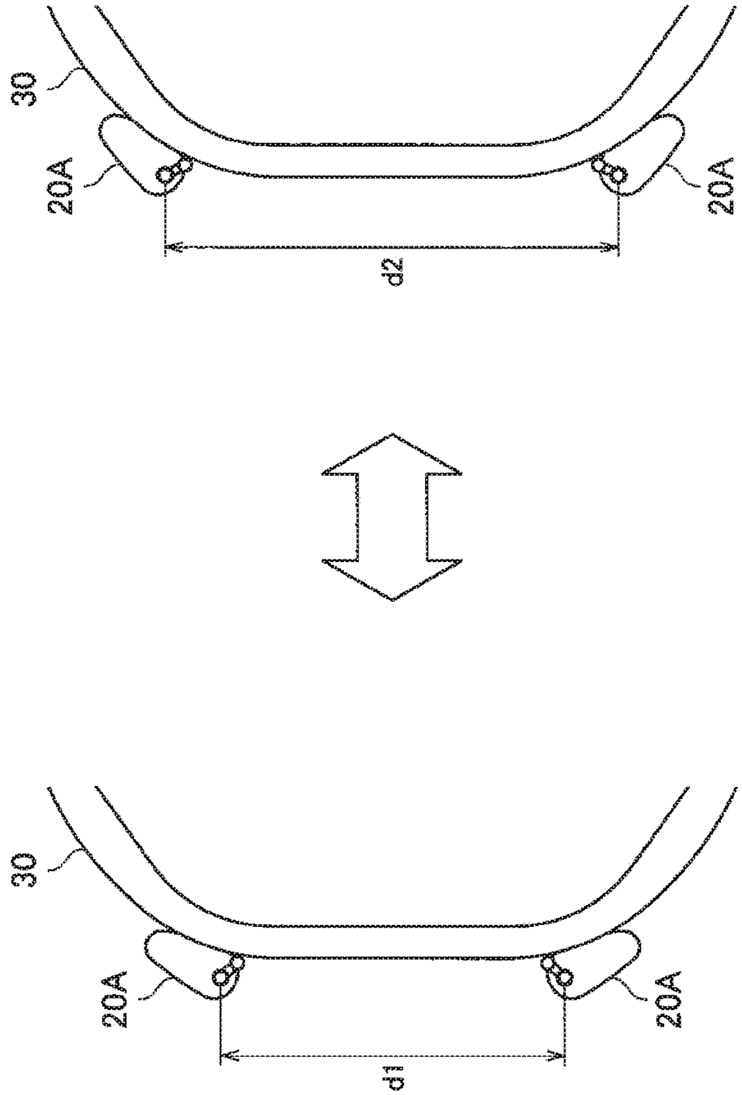
FIG. 17 is an explanatory view illustrating application to watch heads of various sizes.

Furthermore, an interval between the positions where the two end pieces 20 are engaged with the band portion 30 can be adjusted steplessly. For example, as illustrated in FIG. 17, it is possible to adjust the interval between the two end pieces 20 to d1, or to adjust the interval between the two end pieces 20 to d2. Thus, according to the embodiment of the present disclosure, various types of watch heads 10 having different longitudinal lengths can be attached to the band portion 30 via the end pieces 20.

<6. Modifications>

The embodiment of the present disclosure has been described above. Hereinafter, some modifications of the embodiment of the present disclosure will be described. Note that each of the modifications described below may be applied to the embodiment of the present disclosure alone, or may be applied to the embodiment of the present disclosure in combination. Furthermore, each of the modifications may be applied instead of the configuration described in the embodiment of the present disclosure, or may be additionally applied to the configuration described in the embodiment of the present disclosure.

For example, the example has been described above in which the band portion 30 includes the two engaging portions 34, but the band portion 30 may include more engaging portions 34. According to such a configuration, the interval between the two end pieces 20 can be made different depending on which engaging portion 34 the two end pieces 20 are engaged with, and therefore, more various types of watch heads 10 having different longitudinal lengths can be attached to the band portion 30.

Furthermore, the example has been described above in which the two engaging portions 34 are provided separately from each other, but one engaging portion 34 may be formed in the band portion 30, the engaging portion 34 including the opening 342 having a length equal to or longer than a longitudinal length of the watch head 10 assumed to be used. According to such a configuration, it is possible to engage the two end pieces 20 with the one engaging portion 34.

Furthermore, the engaging portion 34 may include metal or resin, and a portion of the band portion 30 other than the engaging portion 34 and the buckle portion 32 may include rubber. According to such a configuration, it is possible to suppress coming off, which occurs against the intention of the wearer, of the connecting portion 220 from the engaging portion 34 by securing the rigidity of the engaging portion 34.

Furthermore, the example has been described above in which the connecting portion 220 and the engaging portion 34 are engaged with each other by rotation of the connecting portion 220, but the connecting portion 220 may be formed slidably with respect to the end piece 20, and the connecting portion 220 and the engaging portion 34 may be engaged with each other by sliding of the connecting portion 220.

Note that although the preferred embodiment of the present disclosure has been described in detail with reference to the accompanying drawings, the technical scope of the present disclosure is not limited to the above examples. A person having ordinary knowledge in a technical field of the present disclosure may obviously find various alterations and modifications within the scope of the technical ideas described in the appended claims, and it should be understood that they will naturally come under the technical scope of the present disclosure.

Furthermore, the effects stated in the present description are merely explanatory or illustrative ones, and are not limitative ones. That is, the technique according to the present disclosure can achieve other effects that are apparent to those skilled in the art from the statement in the present description in addition to or instead of the effects described above.

Furthermore, the following configurations also belong to the technical scope of the present disclosure.

(1)

A band device including an annular band portion that forms a hollow portion, in which the band portion includes:

a sensor module; and an engaging portion detachably engaged with end pieces to which a watch head is attached.

(2)

The band device according to the above-described (1), in which the end pieces each include a piece housing portion including a back surface located on a wearer's skin side and a front surface on a side opposite to the back surface, and a connecting portion protruding from the back surface of the piece housing portion to a side of the band portion, and the engaging portion includes an opening into which the connecting portion of the end piece is inserted.

(3)

The band device according to the above-described (2), in which the connecting portion includes a shaft portion formed along a thickness direction of the piece housing portion, and an overhang portion overhanging from an end portion of the shaft portion in a direction perpendicular to the thickness direction, and the engaging portion includes abutment surfaces that abut the overhang portion on a back surface of the band portion.

(4)

The band device according to the above-described (3), in which a protrusion is formed at each end portion of the overhang portion, the protrusion protruding to a side of the piece housing portion, the abutment surfaces of the engaging portion each abut the protrusion of the overhang portion, and the engaging portion includes a step portion at an edge of each of the abutment surfaces on a side of the opening, the step portion protruding to a side of the wearer.

(5)

The band device according to the above-described (4), in which the band device further includes a plurality of the engaging portions, a plurality of recesses capable of being fitted with the protrusions of the overhang portion is formed on the abutment surfaces of a first engaging portion along an extending direction of the band portion, and the recesses are not formed on the abutment surfaces of a second engaging portion.

(6)

The band device according to any one of the above-described (3) to (5), in which the end pieces each include an elastic portion that urges the connecting portion to a side of the front surface.

(7)

The band device according to the above-described (6), in which the shaft portion is provided rotatably with respect to the piece housing portion.

(8)

The band device according to the above-described (7), in which the piece housing portion includes a guide portion formed along an edge of a hole into which the shaft portion is inserted, the guide portion includes an inclined surface whose height from a back surface of the piece housing portion continuously changes along a circumferential direction of the hole, and the shaft portion includes a sliding portion that slides on the inclined surface when the shaft portion rotates.

(9)

The band device according to any one of the above-described (1) to (8), in which the sensor module includes a pulse sensor, the band portion includes a buckle portion including a central blade, a first movable blade, and a second movable blade, the first movable blade is connected to one end of the central blade, and is folded on one end side of the central blade, the second movable blade is connected to another end of the central blade, and is folded on another end side of the central blade, and the pulse sensor is disposed at an interval portion between the first movable blade and the second movable blade folded on the central blade.

(10)

The band device according to any one of the above-described (1) to (9), in which the band device further includes the end pieces.

(11)

The band device according to the above-described (10), in which the band device further includes the watch head.

(12)

A wristwatch including:

a band portion including a sensor module;

end pieces attachable to and detachable from the band portion; and a watch head attached to the end pieces.

(13)

An end piece including:

a piece housing portion including a back surface located on a wearer's skin side and a front surface on a side opposite to the back surface; and a connecting portion protruding from the back surface of the piece housing portion and detachably engaged with the band portion.

REFERENCE SIGNS LIST

1 Wristwatch
10 Watch head
110 Display surface
112 Lug
113 Pin hole
20 End piece
21 Back surface
22 Front surface
24 Guide portion
26 Inclined surface
27 Locking portion
210 Piece housing portion
213 Pin
214 Cylinder
215 Operating lever
220 Connecting portion
222 Shaft portion
224 Overhang portion
225 Protrusion
226 Sliding portion
230 E-ring
232 Spring
30 Band portion
32 Buckle portion
322 Central blade
324A First movable blade
324B Second movable blade
326, 328 Link
327, 329 Joint
34 Engaging portion
342 Opening
344 Abutment surface
346 Recess
347 Step portion
348 Inclined surface
40 Circuit board
410 Battery
420 Sensor module
421 Pulse sensor
422 Acceleration sensor
423 Gyro sensor
430 Contactless communication unit
440 Wireless communication unit
450 Storage unit
460 Control unit

The invention claimed is:

1. A band device, comprising:
an annular band portion; and
a plurality of end pieces attachable to and detachable from the annular band portion, wherein
the annular band portion includes:
a sensor module;
a first engaging portion which includes a plurality of pairs of recesses;

a second engaging portion;

the first engaging portion and the second engaging portion are detachably engaged with the plurality of end pieces, wherein a watch head is attached to the plurality of end pieces, a first end piece of the plurality of end pieces is engaged with the annular band portion at a first position based on an engagement of the first end piece with a pair of recesses of the plurality of pair of recesses of the first engaging portion, a second end piece of the plurality of end pieces is engaged an interval between the first position and the second position is adjustable, wherein the interval is adjusted based on the first end piece being attachable and detachable with each of the pair of recesses of the plurality of pair of recesses of the first engaging portion; and a buckle portion include a central blade, a first movable blade, and a second movable blade, the first moveable blade includes a first link and a second link, the second movable blade includes a third link and a fourth link, the first link of the first movable blade is connected to a first end of the central blade via a first joint, the third link of the second movable blade is connected to a second end of the central blade via a second joint, the first link is connected to the second link via a third joint, and the third link is connected to the fourth link via a fourth joint, and in a closed state of the buckle portion, the first movable blade is folded on a first side of the central blade and the second movable blade is folded on a second side of the central blade which is opposite to the first side of the central blade, and an interval portion is between the first movable blade folded on the central blade and the second movable blade folded on the central blade.

2. The band device according to claim 1, wherein the sensor module includes a pulse sensor, and the pulse sensor is at the interval portion between the first movable blade and the second movable blade folded on the central blade.

3. The band device according to claim 1, wherein the band device further comprises the watch head.

4. the band device according to claim 1, wherein in the closed state of the buckle portion, the first link and the second link are folded on the first side of the central blade, and the third link and the fourth link are folded on the second side of the central blade.

5. The band device according to claim 1, wherein in a case where the buckle portion transitions from the closed state to an open state of the buckle portion, the first movable blade and the second movable blade are unfolded from the central blade such that:

the first link rotates around the first joint, the second link rotates around the third joint, the third link rotates around the second joint, and the fourth link rotates around the fourth joint.

6. The band device according to claim 1, wherein the plurality of end pieces is detachable from the watch head.

7. The band device according to claim 1, wherein the annular band portion is a wearable device.

8. A wristwatch comprising:

a band portion including a sensor module, and a buckle portion, wherein the band portion includes a first engaging portion which includes a plurality of pair of recesses, and a second engaging portion, the buckle portion includes a central blade, a first movable blade, and a second movable blade, the first movable blade includes a first link and a second link, the second movable blade includes a third link and a fourth link, the first link of the first movable blade is connected the third link of the second movable blade is connected to a second end of the central blade via a second joint, the first link is connected to the second link via a third joint, the third link is connected to the fourth link via a fourth joint, and in a closed state of the buckle portion, the first movable blade is folded on a first side of the central blade and the second movable blade is folded on a second side of the central blade which is opposite to the first side of the central blade, and an interval portion is between the first movable blade folded on the central blade and the second movable blade folded on the central blade;

wherein the first engaging portion and the second engaging portion are detachably engaged with the plurality of end pieces, a first end piece of the plurality of end pieces is engaged with the band portion at a first position baded on an engagement of the first end piece with a pair of recesses of the plurality of pair of recesses of the first engaging portion, a second end piece of the plurality of end pieces is engaged with the band portion at a second position, and an interval between the first position and the second position is adjustable, wherein the interval is adjusted based on the first end piece being attachable and detachable with each of the piar of recesses of the plurality of pair of recesses of the first engaging portion; and a watch head attached to the plurality of end pieces.

* * * * *